April 16, 1940. V. LOUGHEED 2,197,132
REINFORCED PLASTIC STRUCTURE AND METHOD OF MAKING SAME
Filed Feb. 17, 1938
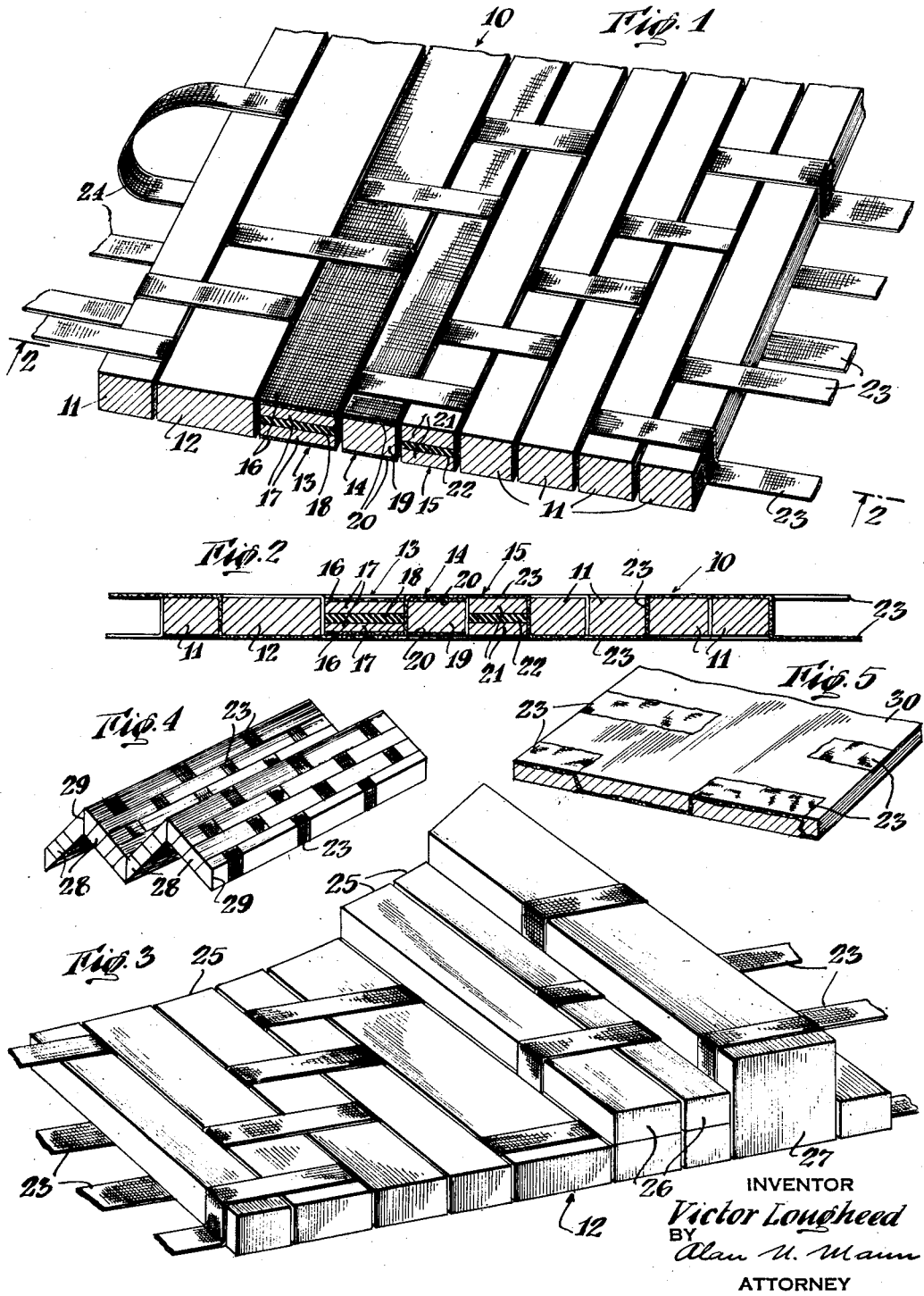
INVENTOR
Victor Lougheed
BY
ATTORNEY Patented Apr. 16, 1940

2,197,132

UNITED STATES PATENT OFFICE 2,197,132

REINFORCED PLASTIC STRUCTURE AND METHOD OF MAKING SAME

Victor Lougheed, Lucketts, Va.

Application February 17, 1938, Serial No. 190,895

13 Claims. (Cl. 154—2)

My invention relates to reinforced plastic panels and the like of unusually high strength and more particularly to the fabrication of such panels or irregular bodies from plastic preforms reinforced in several directions.

The panel or other structure of my present invention is fabricated generally from a multiple preform constituted of a plurality of individual plastic preforms arranged in juxtaposed positions and strung together by a system of reinforced fabric strips located in staggered relationship. The individual preforms may each be of a homogeneous nature, such as a strip or slab of any suitable thermoplastic material, or a briquette of uncured moldable plastic, or they may have various compound structures, including laminations of plastic, rubber, cloth, etc., in various arrangements. The final panel is obtained by molding or pressing the multiple preforms into a dense coherent structure with the aid of heat to occasion softening, or polymerization. The multiple preforms may be molded between flat or curved press surfaces into rigid panels of straight or curved form, or they may be molded in a manner suitable for irregularly-shaped objects.

Resulting panels, in flat rigid form, may be used for walls, partitions, and other constructional elements. An application of my curved forms of panels is in the fuselage and wing surfacings of aeroplanes and other aircraft. A possible use of the structural masses of my invention having varying plan and thickness is in the construction of air propeller blades, approved types of which are irregular in thickness as well as in plan and require the use of high tensile strength materials to prevent disruption of the blade under present high-speed operating conditions.

The novel features of my invention are set forth with particularity in the appended claims; the invention itself however, both as to organization and method of operation, will be clearly understood from the following description taken in conjunction with the accompanying drawing, in which Fig. 1 is an elevational perspective view of one type of panel preform made in accordance with my invention;

Fig. 2 is a sectional view taken along lines 2—2 of Fig. 1;

Fig. 3 is an elevational perspective view of a panel preform providing for irregular outline or plan, as well as for non-uniform thickness;

Fig. 4 is an exaggerated, perspective view of a panel preform modified to meet a special condition; and Fig. 5 is a perspective view of a fragment of the finished molded panel.

Referring now to the several figures in the drawing and first to Figs. 1 and 2, the multiple or panel preform 10 as shown therein comprises a number of individual elongated, plastic, preforms, designed after molding to constitute a single finished panel element. These individual preforms may be made up entirely of plastic material of either the thermoplastic or thermosetting type, or they may consist of combinations of plastic with various other materials selected to confer upon the panel special characteristics of strength, sound-deadening, vibration damping, etc., required in its application, as to the fuselage, wings, control surfaces, and propeller blades of aeroplanes.

The multiple or panel preform such as 10 shown in Figs. 1 and 2 may comprise a number of all-plastic individual preforms such as 11 and 12; or a number of composite preforms as at 13, 14, and 15; or a mixture of differing preforms. The composite preform 13, for example, consists of two outer layers of reinforced fabric 16, laminated with two inner layers of plastic material 17 and an intermediate layer of rubber 18. For the rubber 18 may be substituted paper, cloth or other material. The preform 14 is another type of individual preform consisting of a body of plastic 19 covered on two sides by two layers of reinforced fabric 20. Shown at 15 is a still different type of preform, which consists of two layers of plastic material 21 laminated with an intermediate layer of rubber 22. The reinforced fabric shown at 16 and 20 may be of any suitable type but preferably is of the type disclosed in my copending application Serial No. 184,797, which comprises a web of interwoven organic fiber threads and fine steel wires so arranged that there is no appreciable contact between the steel wires. If desired this fabric may be lacquered with a suitable plastic such as, for example, a phenol-formaldehyde resin.

All of the above described individual preforms, that is, the constituent members or units which make up the multiple or panel preform 10, are held together my means of bands or strips of reinforcing material 23 that are arranged over and around groups of the individual preforms to provide after molding, reinforcement thereof in the two directions not strengthened by such reinforcement as that at 16 and 20, crossing them. The material of the strips 23 may be of the type disclosed in my above copending application Serial No. 184,797 or it may be fabric tape, or merely aggregated or paralleled wires. In the preferred embodiment it consists primarily of the above described web of interwoven fibrous threads and small steel wires, the web being impregnated with a suitable phenol-formaldehyde or other resin, varnish, or equivalent. These strips of plastic-impregnated fabric are woven or arranged in staggered relationship, and preferably systematically, around pairs or similar groups of the preforms as shown in Figs. 1 and 2. This interlacing of the strips around groups of at least two of the individual preforms in staggered fashion is advantageous in that when the aggregate or multiple preform is finally molded there will be no contact line between adjacent individual preforms conducive to bending or breakage, as would be the case if the weaving of the strips 23 did not group individual preforms in pairs or larger groups, and if it were not staggered, that is, if it were only over and under from one preform to the next. For the desired result cannot be accomplished if all the reinforcing strips 23 are run between each of the adjacent individual preforms or panel members. The strips 23 may be fastened at their ends to the panel by any suitable means, or they may be looped back by selvedge weaving, as loosely indicated at 24.

To produce the finished panel from the multiple or panel preform shown in Figs. 1 and 2 and assembled from any of the various types of individual plastic preforms, which are grouped for descriptive purposes in these figures, though any actual panel would not be likely to contain so heterogeneous a mixture, the entire preform is subjected to heat and pressure to soften its plastic ingredients and cause these to flow sufficiently to bond the originally-individual preforms into a unitary, coherent, finished body. This may be accomplished by placing the preform in a closed mold and heating under pressure. This heat and pressure treatment produces a substantially unitary form of composite panel. The molding may be done between platens of a press instead of in a closed mold. If the preforms are made of thermoplastic material the molding operation will cause softening and slight flow of the material into a plastic body which upon cooling will harden and set in desired form. If the preforms are made of thermosetting plastic material the molding treatment will polymerize the plastic and produce a permanently hard, infusible panel. Both of these types of panels would be useful for certain purposes, the infusible type being ordinarily best suited for use in applications subjected to high temperatures.

As a result of the above described molding treatment with heat and pressure, the binding strips 23 are so intimately imbedded in the panel units that a smooth uniform surface is obtained on both sides of the panel. If the binding and reinforcing strips 23 be lacquered or impregnated with plastic this should be of the same type of plastic as that used in the individual preforms or panel, to make them compatible and thus cause them to cohere when molded. Smooth surfacing and more effective covering of the reinforcing wires can be assured by laying a sheet of impregnated paper or canvas on top and bottom of the multiple preform before molding.

The irregular-plan type of panel preform shown to the left in Fig. 3 is suitable, upon molding, for application to objects of varying plan such as fuselage, wings, and control elements of aeroplanes, and avoids an objection to trimming to required plan form, in that it does not expose or cut reinforcing wires. The piled-up combination of irregular thickness as well as irregular plan shown at the right of Fig. 3 permits application of the subsequently molded structure to air propeller blades and other objects of varying contour and thickness. The individual preforms or panel units generally indicated at 12 may be of any desired type, such as those shown in Figs. 1 and 2, or similar combinations, or they may consist entirely of plastic preforms, which may be thermosetting or thermoplastic. The binding and reinforcing strips 23 and any transverse reinforcement, not shown, parallel to the individual preforms, may be of the same type of reinforced fabric material described above in connection with Figs. 1 and 2, and, if impregnated with plastic, this should be compatible with the constitution of the individual preforms. As shown in Fig. 3, the individual preforms 12 each have slanted ends, as indicated at 25 to provide the desired curvature or varying plan of the panel. Other variations in the length, width, and shape, etc., of the individual preforms 12 may likewise be made for varying the plan of the finished panel. Similarly, the thickness of the preform and final panel may be varied by piling up the individual preforms over portions of the structure as shown at 26, at the right of Fig. 3, or by increasing the thickness of certain of the individual preforms as shown at 27.

The arrangement shown in Fig. 4 illustrates a gable type of multiple preform in which the individual preforms 28 are angularly tilted in alternating direction, an arrangement which, in less exaggerated degree than the drawing depicts, is adequate to insure that when flattened down during molding the abutting edges 29 will be more forcibly thrust together than by plastic flow alone. This procedure is particularly useful with some thermoplastics. The individual units 28 may be substantially the same or similar to those described in connection with the preceding figures. They may be held together by means of the reinforced fabric strips 23, impregnated with plastic if desired.

It will be understood that the plastic material used in the above-described panel preforms is of a moldable nature, that is, it is raw, uncured, or unpolymerized, or it is of a nature to soften sufficiently when subjected to heat and pressure in a flat-plate or other suitably-shaped mold to cause the individual preforms to come together and bond into a unitary structure.

In any of the multiple preforms described, besides lacquering with a polymerizable or thermoplastic resin, there may be added granular resin which during molding will aid in bonding the preform into the desired rigid, hard, flat or curved panel, or other irregular body.

A portion of a finished panel, made in accordance with my invention, is shown in section and perspective in Fig. 5. It will be noted that the thickness of the final panel 30 is appreciably less than the thickness of the panel preform shown in section in Fig. 2. This is due to compression of the plastic preforms during the molding operation. In the specific case illustrated in Fig. 5 the thickness of the final panel is about two-thirds that of the preforms shown in Fig. 1. Also, as shown in Fig. 5 the binding and reinforcing strips 23 have been condensed into a somewhat irregular but still effectively-reinforcing arrangement by the pressure applied during the molding operation.

It will be understood from the foregoing description and illustrations in the drawing, particularly Fig. 1, that the multiple preforms and likewise the final panels of my invention are for most purposes preferably reinforced not only in the two dimensions of surface extension but also in the third dimension, of thickness. Thus is conferred not only a good strength increase in directions parallel to the panel surfaces, but also exceptional resistance to splitting. For the reinforced fabric strips 23 which are used initially for holding the individual preforms together not only extend horizontally over the exposed surfaces of the panel units but also extend vertically between certain of the juxtaposed units. This lengthwise, transverse, and vertical arrangement of reinforcing strips in the final molded panel thus provides a reinforcement of the panel in all directions, as must be clear from the fact that the reinforced fabric coverings for some of the panel preforms, such as indicated at 16 and 20 in Fig. 1, contain reinforcing elements that run crosswise of the panel as compared with the reinforcing strips 23 that run lengthwise of the panel. These crosswise reinforcing strips hence serve to reinforce the panel in the third and other dimension, not provided for by the above described two-dimensional reinforcement produced by the binding strips such as 23.

Various modifications and changes may be made in the foregoing description without departing from the scope of my invention. For example, the number and dimensions of the individual preforms may be varied to suit different applications of the final panel. Likewise various other combinations than those illustrated may be used for the composite preforms including simpler or more complex lamination of various reinforcing materials such as metal, wires, wood, leather, fabric and paper.

I claim:

1. A multiple preform comprising a plurality of individual, plastic preforms of substantially rectangular bar-like construction paralleled in juxtaposed position and a plurality of strips of plastic-impregnated fabric interlaced around groups of said individual preforms for binding all of said preforms together as a substantially unitary body.

2. A multiple preform comprising a plurality of individual plastic preforms of substantially rectangular bar-like construction arranged in juxtaposed position and a plurality of staggered strips of plastic-impregnated reinforced fabric interlaced by staggered weaving around pairs of said preforms for holding all of said preforms together as a substantially unitary body.

3. A panel preform comprising a plurality of individual elongated moldable plastic preforms of substantially rectangular bar-like construction located side by side in contiguous relationship, a plurality of strips of flexible reinforcing material extending through said panel preform under and around groups of said individual preforms for holding said preforms together, and a coating of polymerizable plastic material for bonding said preforms together.

4. A multiple preform comprising a plurality of elongated pieces of plastic material of substantially rectangular bar-like construction arranged side by side to form a substantially continuous flat construction, a plurality of flexible reinforced plastic strips extending through said multiple preform and arranged around groups of said elongated strips to hold said members together, said multiple preform being lacquered with a polymerizable resin material.

5. A multiple preform comprising a plurality of elongated individual plastic preforms of substantially rectangular bar-like construction arranged side by side in juxtaposed position, at least some of said individual preforms being composed of laminated layers of reinforced plastic-impregnated fabric and layers of polymerizable plastic, a plurality of strips of reinforced plastic extending through said multiple preform and arranged around groups of said individual preforms to interlock said preforms.

6. A multiple preform comprising a plurality of individual preforms of substantially rectangular bar-like construction composed of polymerizable plastic material, said preforms being of different lengths and having slanted ends and arranged side by side to form an irregular shaped body, a plurality of strips of plastic-impregnated fabric of interwoven fibrous threads and steel wires extending through said multiple preform and arranged around groups of said individual preforms in interlocking relationship.

7. A panel preform comprising a plurality of elongated plastic individual preforms of substantially rectangular bar-like construction arranged side by side to form a flat construction, a plurality of strips of plastic impregnated reinforced fabric extending through said panel preform and interlocking said individual preform, said individual preforms being lacquered with a moldable thermosetting resin.

8. A panel preform comprising a plurality of elongated pieces of polymerizable material of substantially rectangular bar-like construction angularly disposed at their abutting edges and a plurality of strips of plastic impregnated fabric arranged around said elongated strips for bonding said strips together.

9. A method of making a reinforced molded body comprising interlacing with fabric webs a plurality of juxtaposed moldable plastic preforms of substantially rectangular bar-like construction to produce a multiple preform, and applying heat and pressure to said multiple preform to consolidate said individual preforms and fabric webs into a rigid substantially unitary body.

10. A method of making a reinforced molded panel comprising arranging a plurality of moldable plastic preforms of substantially rectangular bar-like construction in juxtaposed position, interlacing a plurality of reinforced fabric strips over and around groups of said preforms in staggered relationship to produce a multiple preform and prevent flexing of the adjacent individual preforms at their contacting surfaces, placing the multiple preform in a mold and applying heat and pressure to consolidate said multiple preform into a unitary panel.

11. A panel reinforced in three dimensions comprising a molded plastic body constituted of a plurality of plastic preforms molded together into a substantially unitary body and a plurality of reinforcing fabric strips imbedded within said body and extending therethrough in three directions.

12. A three-dimensionally reinforced, pressed, structure comprising a body of molded thermoplastic resin constituted of a plurality of plastic preforms molded together into a substantially unitary body and a plurality of reinforcing fabric strips impregnated with thermoplastic resin and consolidated with said body in three dimensions.

13. A three-dimensionally reinforced, pressed, structure comprising a body of molded thermosetting resin constituted of a plurality of plastic preforms molded together into a substantially unitary body and a plurality of reinforcing fabric strips impregnated with thermosetting resin and consolidated with said body in three orientations

VICTOR LOUGHEED.